United States Patent [19]
Amon et al.

[11] Patent Number: 6,113,996
[45] Date of Patent: Sep. 5, 2000

[54] COMPOSITION FOR UNIAXIALLY HEAT SHRINKABLE BIAXIALLY ORIENTED POLYPROPYLENE FILM

[75] Inventors: Moris Amon; Robert G. Peet, both of Pittsford; Salvatore J. Pellingra, Jr., Wolcott, all of N.Y.

[73] Assignee: Mobil Oil Corporation, Fairfax, Va.

[21] Appl. No.: 08/858,850

[22] Filed: May 19, 1997

[51] Int. Cl.[7] .................................................. B65B 53/02
[52] U.S. Cl. .................... 428/34.9; 428/35.7; 428/35.9; 428/35.2; 428/319.7; 428/327; 428/334; 428/515; 428/516; 428/317.9; 428/910
[58] Field of Search ................................. 428/910, 35.7, 428/35.9, 35.2, 34.9, 319.7, 327, 334, 515, 516, 317.9

[56] References Cited

U.S. PATENT DOCUMENTS

| | | | |
|---|---|---|---|
| 3,808,304 | 4/1974 | Schirmer | 264/289 |
| 4,188,350 | 2/1980 | Vicik et al. | 525/232 |
| 4,194,039 | 3/1980 | Mueller | 428/213 |
| 4,377,616 | 3/1983 | Ashcraft et al. | 428/213 |
| 4,390,385 | 6/1983 | Ferguson et al. | 156/229 |
| 4,448,792 | 5/1984 | Schirmer | 426/113 |
| 4,582,752 | 4/1986 | Duncan | 428/317.9 |
| 4,632,869 | 12/1986 | Park et al. | 428/315.5 |
| 4,769,418 | 9/1988 | Mizuno et al. | 525/106 |
| 4,853,602 | 8/1989 | Hommes et al. | 318/38 |
| 4,963,418 | 10/1990 | Isaka et al. | 428/34.9 |
| 5,091,236 | 2/1992 | Keller et al. | 428/213 |
| 5,091,237 | 2/1992 | Schloegl et al. | 428/215 |
| 5,176,954 | 1/1993 | Keller et al. | 428/317.9 |
| 5,264,277 | 11/1993 | Frognet et al. | 428/315.5 |
| 5,267,277 | 11/1993 | Scarola et al. | 376/216 |
| 5,288,548 | 2/1994 | Weber | 428/315.9 |
| 5,292,561 | 3/1994 | Peiffer et al. | 428/35.1 |
| 5,489,454 | 2/1996 | Peiffer et al. | 428/34.9 |
| 5,620,803 | 4/1997 | Oyama et al. | 428/516 |
| 5,691,043 | 11/1997 | Keller et al. | 428/212 |
| 5,851,610 | 12/1998 | Ristey et al. | 428/34.9 |

FOREIGN PATENT DOCUMENTS

| | | |
|---|---|---|
| 0 204 843 | 12/1984 | European Pat. Off. . |
| 0 299 750 | 7/1988 | European Pat. Off. . |
| 0 321 964 | 12/1988 | European Pat. Off. . |
| 0 477 742 A1 | 9/1991 | European Pat. Off. . |
| 0 595 270 A1 | 10/1993 | European Pat. Off. . |

*Primary Examiner*—David W. Wu
*Assistant Examiner*—Caixia Lu-Rutt
*Attorney, Agent, or Firm*—Lori F. Cuomo; Dennis F. Santini

[57] ABSTRACT

A uniaxially heat-shrinkable, biaxially oriented, multilayer film having a polypropylene-containing core layer comprising at least 70 wt. % of said multilayer film and optionally, at least one polyolefin-containing skin layer adjacent said core layer, is prepared by biaxially orienting a coextrudate and therefore orienting said coextrudate by stretching 10 to 40 % in the machine direction. The core layer contains isotactic polypropylene and a sufficient amount of syndiotactic polypropylene to inhibit uniaxial heat shrinkage at temperature below about 50° C. The skin layer can be selected from the group consisting of polypropylene, ethylene-propylene copolymer, polyethylene, and ethylene-propylene-butylene terpolymer.

12 Claims, 4 Drawing Sheets

COMPOSITION FOR UNIAXIALLY HEAT SHRINKABLE BIAXIALLY ORIENTED POLYPROPYLENE FILM

RELATED APPLICATIONS

This case is related by subject matter to U.S. application Ser. No. 08/427,785, filed Apr. 25, 1995, which is a continuation in part of U.S. Ser. No. 08/276,124, filed Jul. 15, 1994. This case is also related by subject matter to U.S. application Ser. No. 08/806,428, filed Feb. 26, 1997.

BACKGROUND OF THE INVENTION

The present invention relates to the field of polymer films and, more particularly, to a uniaxially heat shrinkable biaxially oriented polypropylene film.

As noted in U.S. Pat. No. 4,194,039, polyolefins can be used to prepare shrink films for wrapping purposes. Other suitable synthetic resins include various ionomers, polyvinyl chlorides, polyesters, polystyrenes and polyvinylidene chlorides.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. The resulting shrinkage of the film results in an aesthetically pleasing transparent wrapping which conforms to the contour of the product while providing the usual functions required of packaging materials such as protection of the product from loss of components, pilferage, or damage due to handling and shipment. Typical items wrapped in polyolefin shrink films are toys, games, sporting goods, stationery, greeting cards, hardware and household products, office supplies and forms, foods, phonograph records, and industrial parts.

In certain situations it is desirable to effect shrinkage along a single axis without substantial shrinkage in the cross-direction. For example, in the process of labeling bottles or cans by shrinking a tube or lap-sealed sleeve of heat shrinkable material, if the film shrinks parallel to the container axis, the label may not be placed in the right position but rather placed above or below the desired position upon shrinkage.

In order to obtain uniaxially shrinkable materials, it is possible to employ uniaxially oriented materials, i.e., materials which are oriented in only one direction. However, uniaxially oriented film can lack the requisite strength and toughness necessary for use in such applications. Inasmuch as biaxially oriented films exhibit desirable strength and tear resistance in both directions of orientation, it would be desirable to obtain a uniaxially heat shrinkable film which is biaxially oriented but substantially stable in the cross-direction. In labeling applications, the shrinkable direction usually corresponds to the machine direction (MD) of the film manufacturing process.

For more detailed disclosures of heat shrinkable films, reference may be had to aforesaid U.S. Pat. No. 4,194,039, as well as U.S. Pat. Nos. 3,808,304; 4,188,350; 4,377,616; 4,390,385; 4,448,792; 4,582,752 and 4,963,418, all of which are incorporated herein by reference.

U.S. Pat. No. 5,292,561 (corresponding to EPA 0498249) discloses a process for producing polyolefin shrink films having high unidirectional shrinkage (at least 10% longitudinal shrinkage and less than 2% transverse shrinkage at 100° C.) under conditions comprising an MD reorientation mechanical MD/TD draw ratio between 1.01 and 7.5. The base layer of the films contain propylene polymer and optionally, hydrogenated hydrocarbon resin.

EPA 0204843 discloses a low temperature shrinkable film comprising linear low-density polyethylene resin having film shrink properties of 30% or more MD and 5% or less TD at 90° C., which is prepared by drawing the film at a high draw ratio (3 to 6) in the machine direction.

EPA 0321964 describes a process for extruding a shrink film from a linear low density copolymer of ethylene and at least one alpha-olefin having 3 to 6 carbon atoms to provide a material which exhibits shrinkage at 135° C. of at least 30% MD and at least 10% TD.

EPA 0477742 discloses a transparent polypropylene shrink film which exhibits shrinkage at 100° C. of at least 10% MD and less than 2% TD. The polypropylene comprises a 15% or less, preferably 2 to 6% n-heptane soluble component.

EPA 0299750 discloses a mono- or biaxially stretched film having a heat shrinkage of 20% or more in one of the longitudinal and transverse directions and 60% or more in the other direction. The film comprises principally a linear polyethylene and optionally, a branched low-density polyethylene.

EPA 0595270 discloses a heat sealable laminate having high unidirectional shrinkage produced from biaxially oriented polymeric film such as biaxially oriented polypropylene or blends of polypropylene and copolymers of propylene with minor amounts of ethylene or an alpha-olefin. Uniaxial shrinkability is achieved by balancing MD reorientation process variables such as temperature, draw ratio, line speed, and oriented polymer film properties. Heat sealability is imparted by the presence of a heat seal layer.

Generally, the desired high level of MD shrinkage at label application temperatures (above about 130° C.) is accompanied by proportionally high MD shrinkage at storage temperatures. High MD shrinkage at storage temperatures results in roll tightening and ensuing film distortions and blocking. Another consequence of high MD shrinkage at storage temperatures in the case of film stored after printing is loss of accuracy in the MD label repeat distance.

It is the object of the present invention to provide a biaxially oriented multilayer film comprising a polypropylene core which is uniaxially heat shrinkable with minimal storage temperature shrinkage.

SUMMARY OF THE INVENTION

The present invention relates to a uniaxially heat-shrinkable, biaxially oriented, multilayer film having a polypropylene-containing core layer and optionally, at least one polyolefin-containing skin layer adjacent said core layer. The core layer contains isotactic polypropylene and a sufficient amount of syndiotactic polypropylene to inhibit uniaxial shrinkage at low temperatures.

It has been found that raising the concentration of syndiotactic polypropylene in the core layer provides good high-temperature immediate shrinkage, for example at label application temperatures above about 130° C., while reducing low-temperature long-term shrinkage, up to about 50° C. in hot climates.

The present invention further relates to a uniaxially heat shrinkable, multilayer, biaxially oriented film composition, wherein said film has, at temperatures below about 50° C., a shrinkage in the machine direction of less than about 3%, preferably less than about 2%, after one week, and at temperatures above about 130° C., a shrinkage in the machine direction of at least about 15%, preferably greater than about 18%, after 7 minutes.

DETAILED DESCRIPTION OF THE INVENTION

Core

Figure 1:
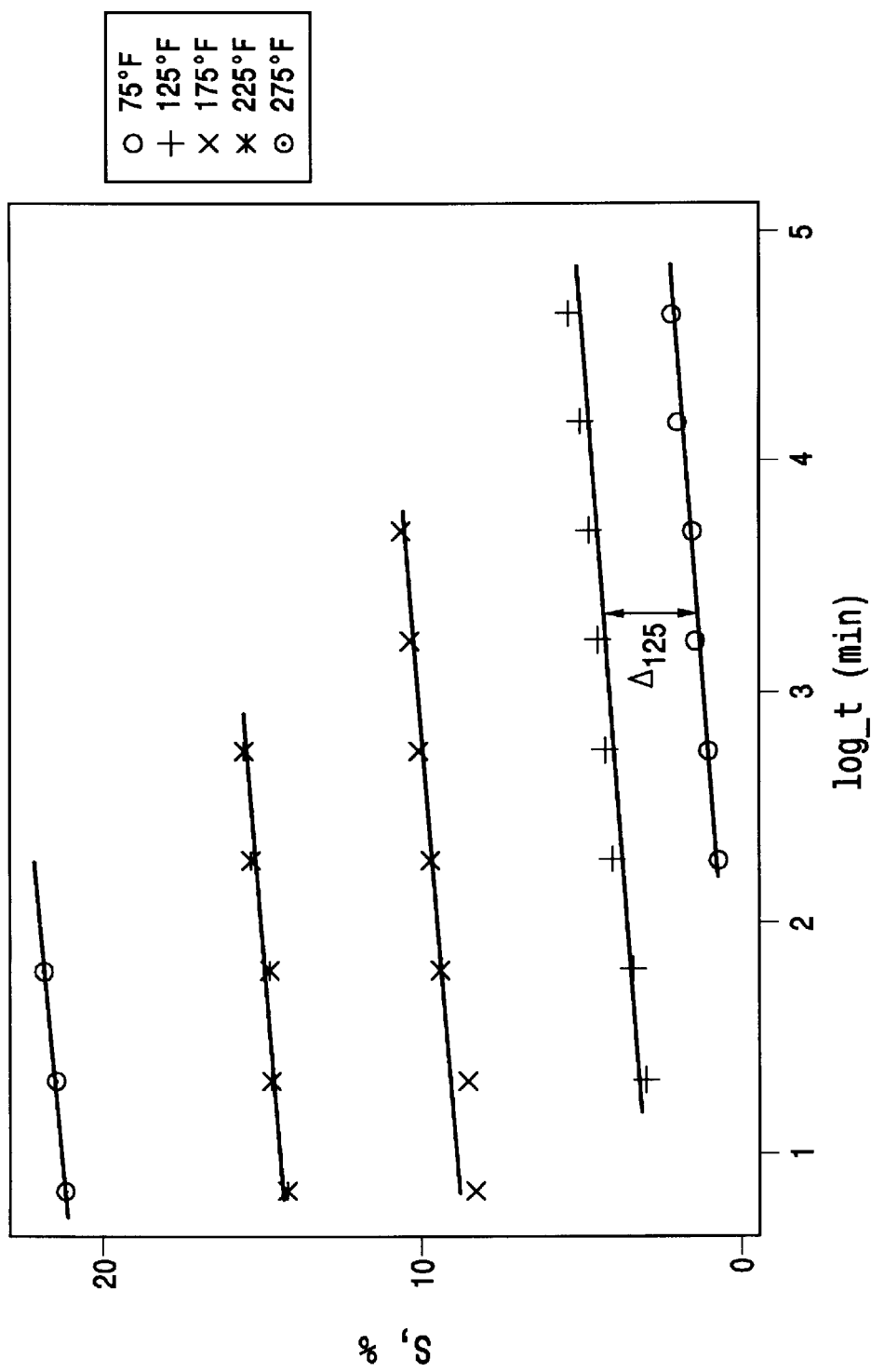
FIG. 1 shows the effect of temperature as a vertical shift $\Delta_T$ of the straight line representing MD shrinkage versus the logarithm of time in minutes at temperature T from the reference line at 75° F. (24° C.).

It has been found that by adding syndiotactic polypropylene to the core layer blend in amounts above 10 wt. %, and particularly 30 wt. %, can achieve high temperature shrinkage while reducing low temperature long-term shrinkage.

Commercially available isotactic propylene suited for use in the present invention includes Fina 3371 from Fina Oil and Chemical Co.

Syndiotactic polypropylene can be present in the core layer in amounts ranging from above 10 wt. % to 60 wt. %, particularly 15 to 45 wt. %. Commercially available syndiotactic polypropylene resins suited for use in the present invention include EOD 9306 and EOD 9502 available from Fina.

The syndiotactic polypropylene used in the present invention can possess an isotacticity of less than 15%, in particular less than 6%.

The weight average molecular weight of both syndiotactic and isotactic polypropylene is preferably between about 60,000 and about 250,000, in particular between about 90,000 and about 160,000. The mean molar masses can be determined according to customary methods; of these, the method of gel permeation chromatography has proven to be particularly suitable.

The core layer of the present invention may also comprise a plurality of voids formed by cavitation about a solid cavitation agent. Polybutylene terephthalate, e.g., in amounts comprising 2 to 16 wt. % of the core layer, well-dispersed as fine spherical particles, e.g., 0.2 to 2 microns in diameter, as described in U.S. Pat. Nos. 5,288,548, 5,267,277 and 4,632,869, the contents of which are incorporated herein by reference, is a suitable cavitation agent. The spherical particles form microvoids on orientation, resulting in a white opaque product. Such a film can further comprise a supporting layer of polypropylene on one or both sides of the core with at least one of said layers containing 4 to 15 wt. % $TiO_2$. Further description of such use of $TiO_2$-containing layers is found in U.S. Pat. No. 5,091,236, the contents of which are incorporated herein by reference. Incorporation of skin layers over the supporting layers serves to encapsulate the abrasive $TiO_2$ and provides a highly opaque, five layer structure. The multilayer film has improved functionality for printing, metallizing, adhesives, coatings, and heat sealability. Alternatively, five layer structures can be prepared by substituting clear supporting layers of polypropylene on both sides of the core, which layers do not contain opacifying materials.

The opacity and low light transmission of the film may be enhanced by the addition to the core layer itself of from about 1% by weight and up to about 10% by weight of opacifying compounds, which are added to the melt mixture of the core layer before extrusion. Opacifying compounds which may be used include iron oxides, carbon black, graphite, aluminum, TiO2, and talc.

The aforementioned blends of isotactic polypropylene and syndiotactic polypropylene and other constituents noted above may be admixed by any suitable means to form a homogeneous blend, such as dry mixing, solution mixing, or mixing the two polymers together while in a molten state or combinations thereof.

Skin Layer

The optional skin layer of the present invention may be any of the coextrudable, biaxially orientable heat shrinkable film-forming resins known in the prior art. Such materials include isotactic polypropylene, atactic polypropylene, polypropylene blended with polybutylene, propylene-butylene copolymers, ethylene-propylene copolymers, polyethylene, and ethylene-propylene-butylene terpolymers.

Ethylene-propylene-butylene random terpolymers suited to use in the skin layers of the present invention include those containing 1–5 wt. % random ethylene, 10–25 wt. % random butylene. The amounts of the random ethylene and butylene components in these copolymers are typically in the range of 10 to 25 percent total (ethylene plus butylene). Typical terpolymers of this type include those with about 1–5 percent ethylene and 10–25 percent butylene. These copolymers typically have a melt flow rate in the range of about 5 to 10 with a density of about 0.9 and a melting point in the range of about 115° to about 130° C.

In one aspect of the invention the skin layer is derived from a linear low density polyethylene (LLDPE). These polymers typically have a melt index of 1 to 10. The linear low density polyethylenes may have a density as high as 0.94, usually in the range 0.90 to 0.91, e.g., 0.92 or 0.91, with a melt index from about 1 to about 10. The linear low density polyethylenes may be derived from ethylene together with other higher comonomers such as butene-1, hexene-1 or octene-1.

Each skin layer adjacent to the core layer can range in thickness from 0.5 to 3 microns (0.02 to 0.12 mil), preferably 0.5 to 1.0 micron (0.02 to 0.04 mil.)

Prior to incorporation in the film, e.g., before extrusion, at least one of the skin layers can be compounded with an anti-blocking effective amount of an anti-blocking agent, e.g., silica, clays, talc, glass, and the like which are preferably provided in the form of approximately spheroidal particles. The major proportion of these particles, for example, anywhere from more than half to as high as 90 wt. % or more, will be of such a size that significant portion of their surface area, for example, from about 10 to 70% thereof, will extend beyond the exposed surface of the skin layer. In a preferred embodiment, the anti-blocking agent comprises non-meltable silicone resin, e.g., particulate cross-linked polysiloxanes. Particularly preferred are non-meltable polysiloxane spheres characterized as having a mean particle size of 0.5 to 20.0 microns and a three dimensional structure of siloxane linkages. Such materials are available from Toshiba Silicone Co., Ltd., worldwide, and in the United States from General Electric Co., and are marketed under the trade name Tospearl. Other commercial sources of similar suitable materials are also known to exist. Such materials are further described as non-meltable crosslinked organosiloxane resin powders in U.S. Pat. No. 4,769,418, incorporated herein by reference. Effective amounts of the particulate cross-linked polysiloxane antiblocking agent can range from 100 to 5000 ppm, preferably 1000 to 3000 ppm, based on loading of the resin from which the skin layer is prepared.

Reduced coefficient of friction (COF) and reduced antistatic characteristics at the surface of the skin layer or layers can be achieved in accordance with the disclosure set out in U.S. Pat. No. 5,264,277, incorporated herein by reference, which discloses the use of migratory slip agents and antistatic agents in multilayer films. Reduced COF may also be obtained by treating one or both skins with 2000 to 15000 ppm silicone oil.

If desired, the exposed surface of the skin layer or skin layers can be treated in a known and conventional manner, e.g., by corona discharge to improve its receptivity to printing inks, coatings, adhesive anchorage, and/or its suitability for such subsequent manufacturing operations as lamination.

It is preferred that all layers of the multilayer film structures of the present invention be coextruded, after which the film can be biaxially oriented (primary orientation) and thereafter secondarily oriented in the direction in which shrinkability is desired. Coextrusion can be carried out in a multilayer melt form through a flat die.

Primary Orientation

The multilayer coextrudate film can be primarily oriented biaxially. Biaxially oriented film can be stretched 3 to 6 times, typically 4 to 5 times in a first direction, typically the machine direction (MD), and 5 to 10 times, typically 7 to 8 times in a second direction which is substantially normal to the first direction, preferably the transverse direction (TD). Generally, biaxial orientation temperatures differ for MD orientation (115° to 130° C., e.g., 120° C.) and TD orientation (130° to 160° C., e.g., 150° C.). Film thickness at this stage can range from 15 to 75 microns (0.6 to 3 mils), preferably 25 to 50 microns (1 to 2 mils). Cooling of the film to temperatures below 100° C. occurs prior to secondary orientation.

Secondary Orientation

The primarily oriented film is then reheated to 100° to 125° C., say 110° to 115° C., typically by use of heated rollers and stretched an additional 10 to 40%, typically 25 to 30%, in the first direction of orientation only, i.e., machine direction (MD). In order to minimize TD contraction which can adversely affect second direction heat stability, e.g., TD heat stability, it is desirable to maintain a minimal distance between the stretching rollers used in secondary orientation. Such distances can be less than 30 cm, e.g., 5 to 10 cm.

The resulting uniaxially shrinkable film after secondary orientation can range in thickness from 10 to 60 microns (0.4 to 2.4 mils), preferably 20 to 50 microns (0.8 to 2.0 mils).

Simultaneous Orientation

The films of the present invention can also be prepared by orienting on a line which utilizes linear motors to directly propel opposed pairs of tenter clips synchronously. The film can be primarily oriented by synchronously accelerating along a diverging path, directly opposed pairs of tenter clips holding the film, thus achieving simultaneous biaxial orientation. Secondary machine direction orientation on the same tenter can be effected along a parallel path subsequent to the diverging path by simultaneously accelerating the directly opposed pairs of tenter clips along some portion of the parallel path.

The use of linear motors to directly propel tenter clips to effect simultaneous biaxial stretching is further disclosed in U.S. Pat. No. 4,853,602 to Hommes et al., the contents of which are incorporated herein by reference in their entirety.

Dimensional Stability

The resulting uniaxially shrinkable film exhibits greater than 15% shrinkage, preferably greater than 18% shrinkage or even 25% shrinkage in the direction of secondary orientation, e.g. machine direction, after 7 minutes of exposure to a temperature above 130° C. However, at temperatures below about 50° C., a shrinkage in the same direction of less than 3%, preferably less than 2%, after seven days is obtained. The present invention's films can exhibit ±5% stability, preferably −2% to +1% stability in the direction normal to that of secondary orientation. Stability of −2% to +1% means that the dimension of the film normal to the direction of secondary orientation, after heating to a temperature above 130° C. shrinks no more than 2% or expands no greater than 1% of the original dimension of the film at room temperature.

The higher temperature range given in the preceding paragraph is typical for the application of labels to containers. The lower temperature range is typical for the storage of film rolls prior to label application. Hence, the shrinkage behavior described ensures good conformance of labels to containers but minimizes defects due to excessive shrinkage in roll form.

The invention is illustrated by the following non-limiting examples in which all parts are by weight unless otherwise specified.

EXAMPLES

Example 1

A series of 17 experimental runs, numbered 1 to 5, 5.1, and 6 to 16 are described below.

Isotactic polypropylene (MP=163° C. (325° F.), melt index=3), Fina 3371, available from Fina, is employed as the isotactic propylene homopolymer component of the core layer. Syndiotactic polypropylene, Fina EOD-9502 (MP=120° C. (248° F.), melt index=4) available from Fina, is added to the core layer in the amounts shown in Table 1 below.

The core component(s) are melted in an extruder with a screw of L/D ratio of 20/1 to provide the core layer. A second and third extruder, in association with the first extruder, is supplied with an ethylene-propylene-butylene terpolymer (Chisso 7701), (3.3% ethylene, 3.8% butylene content, MFI=5)) to provide the two skin layers, one of which contains 2000 ppm Tospearl 145, a crosslinked organosiloxane sphere with a nominal 4.5 micron mean diameter. A melt coextrusion is carried out while maintaining the barrel of the core polymer material extruder at a temperature sufficient to melt the polymer mixture, i.e., from 232° to 288° C. (450° to 550° F.). The terpolymers to be extruded as skin layers are maintained in the second extruder and third extruders at about the same temperature as the components used in fabricating the core layer. The two streams of E-P-B terpolymer of the second and third extruders enable the formation of skin layers on each surface of the core layer.

A three-layer film is coextruded with a core thickness representing about 92% of the overall extruded thickness, with the thickness of each skin layer representing about 4% of the film thickness. The resultant film sheet is subsequently stretched 4.5 times in the machine direction and 8 times in the transverse direction using a commercially available sequential biaxially orienting apparatus to provide a multilayer film structure. The machine direction (MD) orientation is conducted at 127° C. (260° F.) and the transverse direction (TD) orientation is conducted at 149–160° C. (300–320° F.).

The resultant film is thereafter secondarily oriented in the MD direction by stretching on a series of five rollers heated at 110–121° C. (220–250° F.) directly after the TD orienter. Samples are collected which are secondarily oriented by MD stretching. Secondary MD stretch is measured as the percentage of increase in length of the film after secondary orientation, which is approximated by the percentage increase of roll speed.

After the secondary MD stretch the film is annealed by moderate heating. This can be done by means of an infrared (IR) heater and/or a pair of heated rollers. In addition, annealing can be accomplished by carrying out most of the secondary MD stretch further upstream in the above-mentioned series of five rollers and raising the temperature of the last one. The annealing conditions used in this Example are set forth in Tables 1 and 2.

The terpolymer skin on one side of the film is corona discharge treated while the terpolymer skin on the other side contained 2000 ppm of Tospearl 145, a cross-linked organosiloxane sphere with a 4.5 micron mean diameter, which is added prior to coextrusion. The final film thickness is 20 microns (0.8 mils).

TABLE 1

EXPERIMENTAL RUNS

| RUN # | % SYNDIO | IR | ANNEALING ROLLERS ° F. | MDO2 |
|---|---|---|---|---|
| 1 | 4 | off | 100 | A |
| 2 | 4 | on | 100 | B |
| 3 | 4 | off | 150 | B |
| 4 | 4 | on | 150 | A |
| 5 & 5.1 | 60 | off | 100 | A |
| 6 | 60 | on | 100 | B |
| 7 | 60 | off | 150 | B |
| 8 | 60 | on | 150 | A |
| 9 | 30 | off | 100 | A |
| 10 | 30 | on | 100 | B |
| 11 | 30 | off | 150 | B |
| 12 | 30 | on | 150 | A |
| 13 | 4 | off | 100 | A |
| 14 | 4 | on | 100 | B |
| 15 | 4 | off | 150 | B |
| 16 | 4 | on | 150 | A |

Key:
% syndio = % Fina EOD-9502 in core layer; balance is Fina 3371.
IR = Infra-red heater between corona and annealing rollers; adjust to film temperature of 180° F. (82° C.) when on.
Annealing Rolls = Water temperature of annealing rolls, ° F.
MDO2 = Letters designate two configurations; see Table 2 below.

For each of the 17 experimental runs, the MD shrinkage is measured in two replicates at the following temperatures and exposure times as set forth in Table 3 below. FIG. 1 is a graphical representation of the data obtained from Run 1.

TABLE 3

MD SHRINKAGE MEASUREMENTS

| | 7 m | 20 m | 1 h | 3 h | 8 h | 24 h | 3 d | 9 d | 27 d |
|---|---|---|---|---|---|---|---|---|---|
| 275° F. (135° C.) | X | X | X | | | | | | |
| 225° F. (107° C.) | X | X | X | X | X | | | | |
| 175° F. (79° C.) | X | X | X | X | X | X | X | | |
| 125° F. (57° C.) | | X | X | X | X | X | X | X | X |
| 75° F. (24° C.) | | | | X | X | X | X | X | X |

Key:
m = minutes
h = hours
d = days

The presentation of results of Example 1 relies on an empirically verified special relationship between unconstrained MD film shrinkage (s) as a function of time (t) in minutes and temperature (T). It has been found that:

1. s is a linear increasing function of the logarithm of t, log(t), at constant T, and
2. the slope of this function, i.e. the rate of change of s with respect to log(t) at constant T, is nearly independent of T for a given film type and set of process conditions.

The effect of temperature can be graphically expressed as a vertical shift $\Delta_T$ of the straight line at T from the reference line at room temperature (75° F.) (24° C.). This is illustrated for Run 1 in FIG. 1.

The process conditions effecting the on-line annealing or stress relaxation of the film have little effect on the slope or shift factors. In contrast, changing the amount of syndiotactic polypropylene in the core layer composition has a marked effect.

Figure 2:
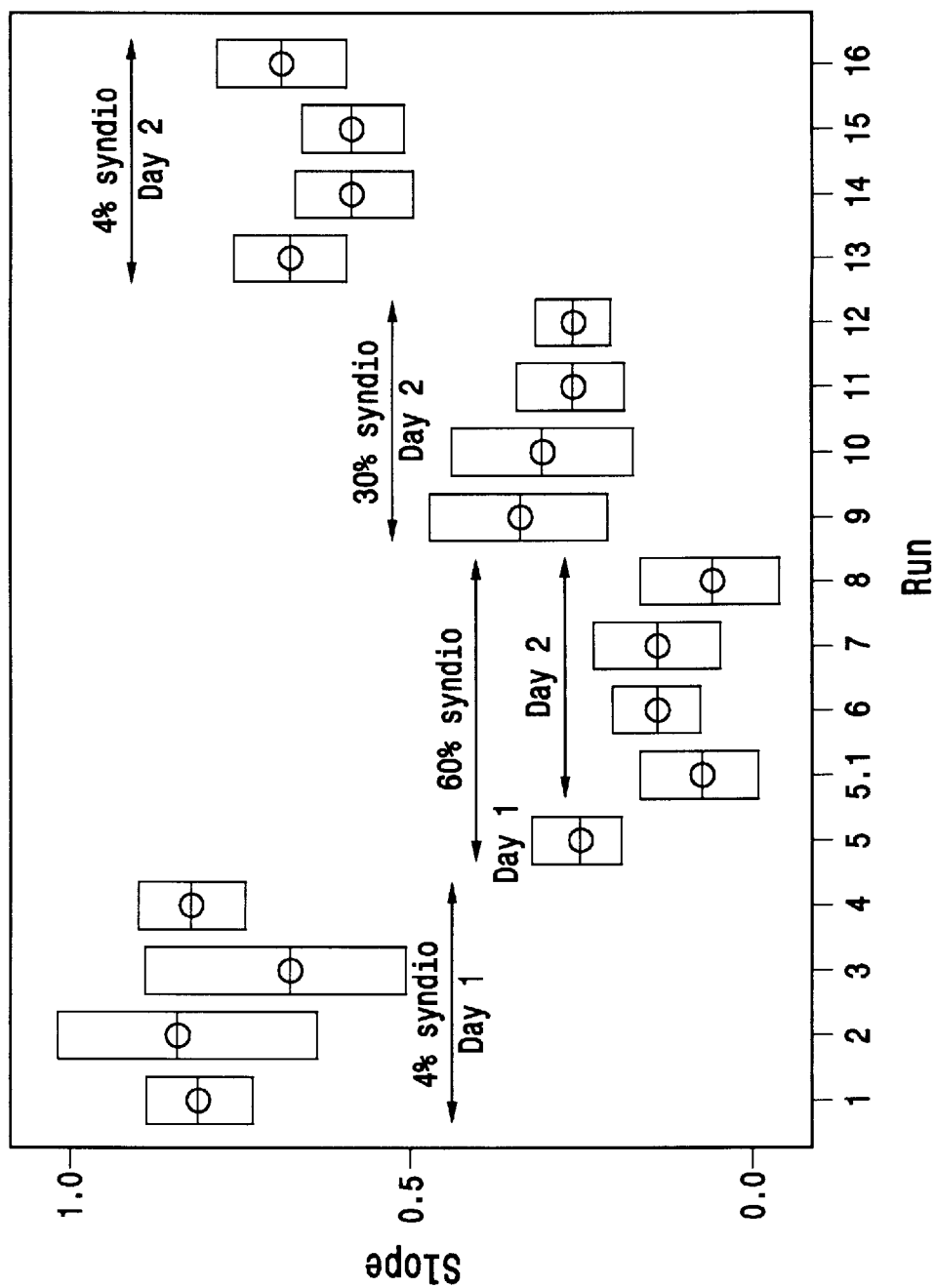
FIG. 2 shows the temperature independent slope of the MD shrinkage versus log(time) line for various experimental runs.

FIG. 2 shows the temperature-independent slope of the s vs. log(t) line with +/−2 standard error bars for Runs 1 to 16. Each bar is reduced from a separate plot similar to FIG. 1. Each group of 4 consecutive bars represents 4 different process conditions and one core layer composition. (The second group from the left in FIG. 2 has 5 bars because Run 5.0 and 5.1 are identical, except that they are performed on 2 different days.) The same process conditions are repeated

TABLE 2

MDO2 CONFIGURATIONS

| | ROLL 1 | | ROLL 2 | | ROLL 3 | | ROLL 4 | | ROLL 5 | |
|---|---|---|---|---|---|---|---|---|---|---|
| | sp | temp | sp | temp | sp | temp | sp | temp | sp | temp |
| A | 1.01 | 200° F. (93° C.) | 1.01 | 250° F. (121° C.) | 1.01 | 250° F. (121° C.) | 1.20 | 250° F. (121° C.) | 1.06 | 70° F. (21° C.) |
| B | 1.01 | 250° F. (121° C.) | 1.01 | 250° F. (121° C.) | 1.26 | 250° F. (121° C.) | 1.01 | 200° F. (93° C.) | 1.01 | 180° F. (82° C.) |

Key:
sp = speed ratio to previous drive
temp = water temperature in the same order for each composition. The effect of the process conditions is statistically insignificant. The variation among the 4 bars in a group is a reflection of random experimental error.

In addition, the 4% syndiotactic polypropylene composition is run on 2 consecutive days, labeled as Day 1 and Day 2. This provides a further estimate of the random variation of the s vs. log(t) slope. Taking into account random variation from both of the mentioned sources, the effect of core layer composition is significant in statistical and practical terms. The results show that increasing the syndiotactic polypropylene content of the core from 4 wt. % to about 30 wt. % approximately halves the rate of increase of s per unit log(t). A further approximate halving occurs upon going to 60 wt. % syndiotactic polypropylene.

Figure 3:
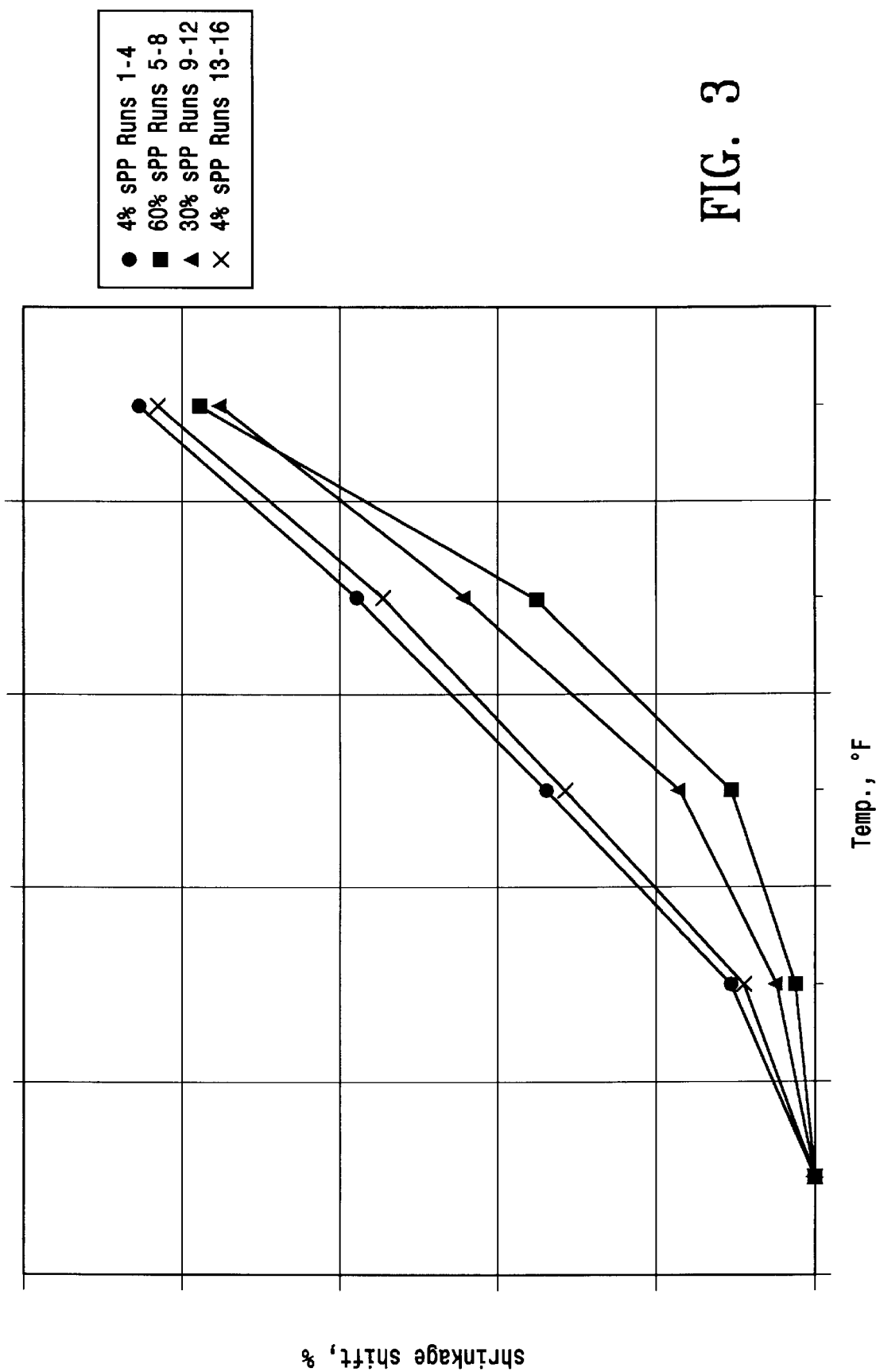
FIG. 3 shows the vertical shift factors $\Delta_T$ plotted as a function of temperature for various film compositions.

The vertical shift factors $\Delta_T$ for the 4 experimental run groups of FIG. 2 are plotted as a function of temperature in FIG. 3. Again, the effect of composition is statistically significant in relation to random variation, while the effect of process conditions is not. The 4 process conditions in each group are averaged to simplify the graph. By definition, $\Delta_T$ at room temperature (75° F.) (24° C.) is always 0.

FIG. 3 shows the shrinkage shifts at intermediate temperatures are lower for 30 wt. % syndiotactic polypropylene and 60 wt. % syndiotactic polypropylene than for 4 wt. % syndiotactic polypropylene in the core. At the label application temperature of 275° F. (135° C.), however, all compositions perform about equally. As is the case for the slopes, 60 wt. % syndiotactic polypropylene provides a greater benefit than 30 wt. % syndiotactic polypropylene in terms of low-temperature, under 200° F. (93° C.) dimensional stability.

Figure 4:
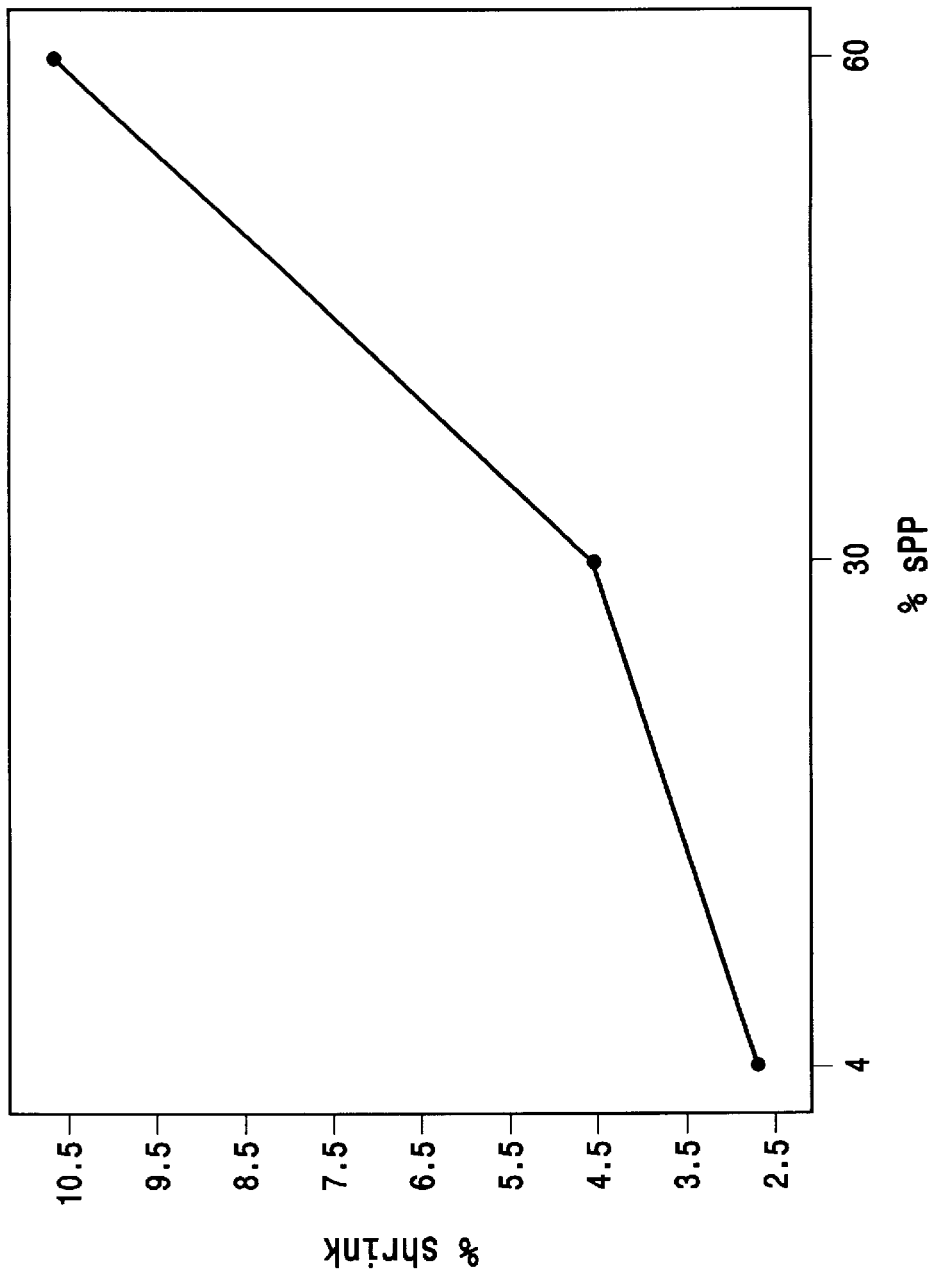
FIG. 4 shows TD shrinkage after 7 minutes at 275° F. (135° C.) as a function of syndiotactic polypropylene content in the core layer.

FIG. 4 shows the effects of wt. % syndiotactic polypropylene on TD dimensional stability. Sixty wt. % syndiotactic polypropylene in the core increases TD shrinkage as compared to 4 wt. % syndiotactic polypropylene and 30 wt. % syndiotactic polypropylene. It must be understood, however, that the entire curve in FIG. 4 can be shifted downward by at least 2% shrinkage by varying certain process conditions in the tenter. In fact, at 4% syndiotactic polypropylene loading, negative TD shrinkage (i.e. TD growth) can be generated, although it is highly undesirable for label applications.

Although 60 wt. % syndiotactic polypropylene in the core is preferable to 30 wt. % syndiotactic polypropylene in terms of long term MD shrinkage at 100° F. (38° C.) to 200° F. (93° C.), other considerations point to 30 wt. % syndiotactic in the core as a better overall multilayer structure for the following reasons:

1) the cost of syndiotactic polypropylene is high in relation to isotactic polypropylene;
2) 60 wt. % syndiotactic polypropylene produces high levels of TD shrinkage at 275° F.; and
3) operation of the orientation line with 60 wt. % syndiotactic polypropylene is difficult because of frequent web breaks in the tenter.

Example 2

This example illustrates the combined effect of reductions in slope and temperature shift on storage stability for a roll of shrink film prepared in accordance with Runs 1, 5 and 9, as set forth in Example 1, from manufacture until converting.

Stage 1: 9 months, Sept. to May in a heated warehouse, average 75° F.

Stage 2: 3 months, June to July, in a warehouse, average 88° F.

Stage 3: 3 days in a transport van, hot climate, average 100° F.

Using the experimentally determined slopes and vertical shifts, the following shrinkage amounts are calculated:

TABLE 4

CALCULATED SRRINKAGE IN STORAGE

| Run # | % sPP in core | total MD shrinkage % |
|---|---|---|
| 1 | 4 | 9.8 |
| 5 | 30 | 4.3 |
| 9 | 60 | 1.6 |

The calculations assume an unconstrained piece of film. In practice, the roll's own geometry does pose a constraint. Therefore, actual dimensional change is less than tabulated. Instead, there is a gradual increase in tension and roll hardness, and the tabulated % shrinkages provide a good index of this increase, which is detrimental to product quality.

Increasing the syndiotactic polypropylene content of the core layer from 4 to 30 wt. % causes a substantial reduction in long-term MD shrinkage at storage temperatures, which are not likely to exceed 125° F. (520° C.). The shrinkage reduction at label application temperatures, typically 275° F. (135° C.), is minimal. Employing 60 wt. % syndiotactic polypropylene in the core layer gives even larger benefits in terms of machine direction shrinkage, but the cost and TD shrinkage at label application temperatures becomes too high. It is also found that the storage stability gains described in this application cannot be achieved by improved annealing of the film on the orientation line.

It will be apparent to those skilled in the art that the specific embodiments discussed above can be successfully repeated with ingredients equivalent to those generically or specifically set forth above and under variable process conditions. From the foregoing specification, one skilled in the art can readily ascertain the essential features of this invention and without departing from the spirit and scope thereof can adapt it to various diverse applications.

It is claimed:

1. A uniaxially heat-shrinkable, biaxially oriented, multi-layer film having a polypropylene-containing core layer, said core layer containing isotactic polypropylene and a sufficient amount of syndiotactic polypropylene to inhibit long-term uniaxial shrinkage at temperatures below about 50° C.

2. The multilayer film of claim 1, wherein said core layer comprises syndiotactic polypropylene in an amount greater than 10 wt. %.

3. The multilayer film of claim 2, wherein said core layer comprises syndiotactic polypropylene in an amount in the range of 15 wt. % to 45 wt. %.

4. The multilayer film of claim 1, comprising at least one polyolefin-containing skin layer adjacent said core layer.

5. The multilayer film of claim 1, wherein said film is capable of greater than 15% shrinkage at 130° C. or higher in a first direction with ±5% or less stability in a second direction substantially normal to said first direction.

6. The multilayer film of claim 1, wherein said core layer comprises a plurality of voids formed by cavitation about a solid cavitating agent.

7. The multilayer film of claim 1, wherein said core layer contains 4 to 8 wt. % polybutylene terephthalate (PBT) dispersed as particles of 0.2 to 2.0 microns diameter.

8. The multilayer film of claim 1 further comprising a polypropylene supporting layer containing 4 to 15 wt. % $TiO_2$ adjacent to said core layer.

9. The multilayer film of claim 1, which is primarily oriented by biaxially orienting 3 to 6 times in the machine direction, and 5 to 10 times in the transverse direction, and secondarily oriented by reorienting an additional 10 to 40% in the machine direction.

10. The multilayer film of claim 4, wherein said skin layer is selected from at least one of the group consisting of polypropylene, ethylene-propylene copolymer, polyethylene, propylene-butylene copolymer, and ethylene-propylene-butylene terpolymer, said skin layer having a thickness of 0.5 to 1.0 micron.

11. The multilayer film of claim 4, wherein said skin layer contains a non-meltable silicone resin.

12. A uniaxially heat shrinkable, multilayer, biaxially oriented film composition, wherein said film has at temperatures below about 50° C. a shrinkage in the machine direction of less than about 3%, after one week, and at temperatures above about 130° C., a shrinkage in the machine direction of at least about 15%, after 7 minutes.

* * * * *